(12) United States Patent
Line et al.

(10) Patent No.: US 10,906,444 B2
(45) Date of Patent: Feb. 2, 2021

(54) MULTI-FUNCTION CONNECTIVITY MODULE

(71) Applicant: Ford Global Technologies, LLC, Dearborn, MI (US)

(72) Inventors: Johnathan Andrew Line, Northville, MI (US); Marcos Silva Kondrad, Macomb Township, MI (US); Amaury Diaz Serrano, Lathrup Village, MI (US); Kevin Wayne Preuss, Berkley, MI (US); Daniel Ferretti, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 310 days.

(21) Appl. No.: 15/997,791

(22) Filed: Jun. 5, 2018

(65) Prior Publication Data

US 2019/0366900 A1 Dec. 5, 2019

(51) Int. Cl.
*B60N 3/00* (2006.01)
*B60N 2/75* (2018.01)
*B60R 7/04* (2006.01)
*B60R 11/02* (2006.01)
*B60R 16/02* (2006.01)
*B60R 16/023* (2006.01)

(52) U.S. Cl.
CPC .............. *B60N 3/001* (2013.01); *B60N 2/79* (2018.02); *B60R 7/04* (2013.01); *B60R 11/02* (2013.01); *B60R 16/02* (2013.01); *B60R 16/023* (2013.01)

(58) Field of Classification Search
CPC .. B60N 3/001; B60N 2/79; B60R 7/04; B60R 11/02; B60R 16/02; B60R 16/023
USPC ...................................................... 296/24.34
See application file for complete search history.

(56) References Cited

U.S. PATENT DOCUMENTS

| | | | |
|---|---|---|---|
| 2,797,739 A | 7/1957 | Orsini | |
| 5,179,447 A * | 1/1993 | Lain .................. | B60N 3/00 348/837 |
| 6,032,587 A | 3/2000 | Salenbauch et al. | |
| 6,220,660 B1 | 4/2001 | Bedro et al. | |
| 6,347,590 B1 | 2/2002 | D'Annunzio et al. | |
| 6,547,323 B1 | 4/2003 | Aitken et al. | |
| 7,798,072 B2 | 9/2010 | Becker et al. | |
| 8,528,956 B1 * | 9/2013 | Winiger ............... | B60R 7/04 296/24.34 |
| 9,168,850 B2 | 10/2015 | Meszaros et al. | |
| 9,849,819 B2 | 12/2017 | Farooq et al. | |
| 2003/0234550 A1 | 12/2003 | Brooks et al. | |
| 2004/0217615 A1 * | 11/2004 | Lindstrom ........... | B60R 7/04 296/24.34 |

* cited by examiner

*Primary Examiner* — Joseph D. Pape
(74) *Attorney, Agent, or Firm* — David Coppiellie; Price Heneveld LLP (57) ABSTRACT

A vehicle includes a connectivity module. The connectivity module includes at least one deployable work surface extendably coupled thereto, a compartment within the connectivity module, a device holder deployably housed within the compartment, and an armrest slidably coupled to a first side of the connectivity module that conceals at least one of a power outlet and a mobile device connector.

19 Claims, 5 Drawing Sheets

MULTI-FUNCTION CONNECTIVITY MODULE

FIELD OF THE INVENTION

The present disclosure generally relates to a connectivity module. More specifically, the present disclosure relates to a multi-function connectivity module.

BACKGROUND OF THE INVENTION

Vehicles have been provided with a variety of storage solutions. However, many of these storage solutions are stationary or fixed to the vehicle in a manner that does not allow for customization of a cabin of the vehicle. Accordingly, new solutions are needed that enhance the user experience while not impeding the customization of the cabin of the vehicle.

SUMMARY OF THE INVENTION

According to a first aspect of the present disclosure, a vehicle includes a connectivity module. The connectivity module includes at least one deployable work surface extendably coupled thereto, a compartment within the connectivity module, a device holder deployably housed within the compartment, and an armrest slidably coupled to a first side of the connectivity module that conceals at least one of a power outlet and a mobile device connector.

Embodiments of the first aspect of the present disclosure can include any one or a combination of the following features:
- the vehicle includes a rail assembly, wherein the connectivity module is slidably coupled to the rail assembly;
- the vehicle includes a rail assembly, wherein the connectivity module is slidably coupled to the rail assembly and is rotatable about a vertical axis relative to the rail assembly;
- the mobile device connector includes a USB plug;
- the connectivity module is positioned in close proximity to one or more seating assemblies;
- the one or more seating assemblies are equipped with a vehicle interaction interface;
- the at least one deployable work surface is actuated from a stowed position to a deployed position by linear actuation in a vertical direction and rotational actuation toward a user;
- the device holder is actuated from a stored position to a use position by linear and rotational motion; and
- the rotational motion of the device holder occurs along at least two planes of rotation.

According to a second aspect of the present disclosure, a vehicle includes a connectivity module slidably and rotatably coupled to a rail assembly. The connectivity module includes at least one deployable work surface extendably coupled thereto, a compartment within the connectivity module, a device holder deployably housed within the compartment, and an armrest slidably coupled to a first side of the connectivity module that conceals at least one of a power outlet and a mobile device connector.

Embodiments of the second aspect of the present disclosure can include any one or a combination of the following features:
- the rotatable coupling of the connectivity module provides rotatable motion of the connectivity module about a vertical axis relative to the rail assembly;
- the connectivity module is positioned in close proximity to one or more seating assemblies;
- the one or more seating assemblies are equipped with a vehicle interaction interface;
- the at least one deployable work surface is actuated from a stowed position to a deployed position by linear actuation in a vertical direction and rotational actuation toward a user;
- the device holder is actuated from a stored position to a use position by linear and rotational motion; and
- the rotational motion of the device holder occurs along at least two planes of rotation.

According to a third aspect of the present disclosure, a connectivity module includes at least one deployable work surface extendably coupled thereto, a device holder deployably housed within a compartment, and an armrest slidably coupled to a first side of the connectivity module that conceals at least one of a power outlet and a mobile device connector. The connectivity module is slidably coupled to a rail assembly. The connectivity module is rotatable about a vertical axis relative to the rail assembly.

Embodiments of the third aspect of the present disclosure can include any one or a combination of the following features:
- the at least one deployable work surface is actuated from a stowed position to a deployed position by linear actuation in a vertical direction and rotational actuation toward a user;
- the device holder is actuated from a stored position to a use position by linear and rotational motion, wherein the rotational motion of the device holder occurs along at least two planes of rotation; and
- the connectivity module is installed in a vehicle.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
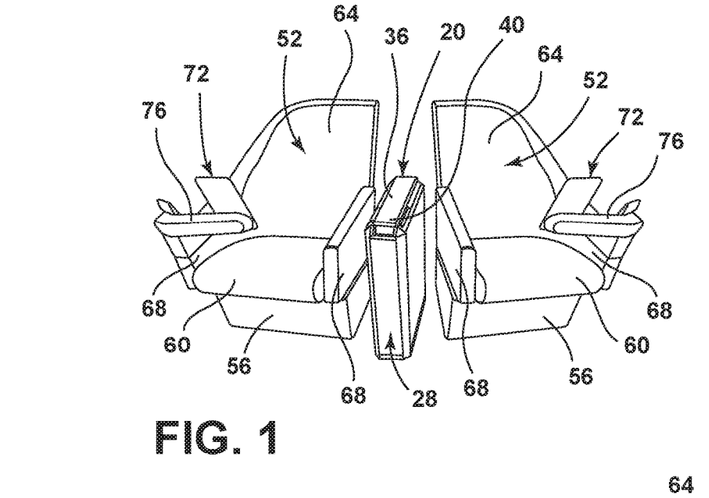
FIG. 1 is a front perspective view of a connectivity module positioned between two seating assemblies, according to one embodiment.
Figure 2:
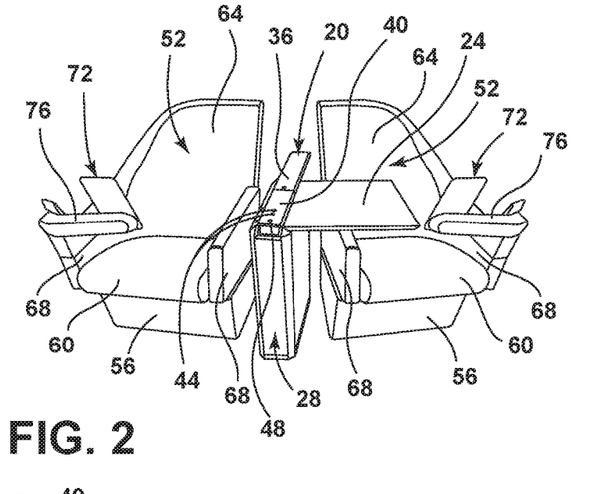
FIG. 2 is a front perspective view of the connectivity module, illustrating a work surface extended over one of the seating assemblies.
Figure 3:
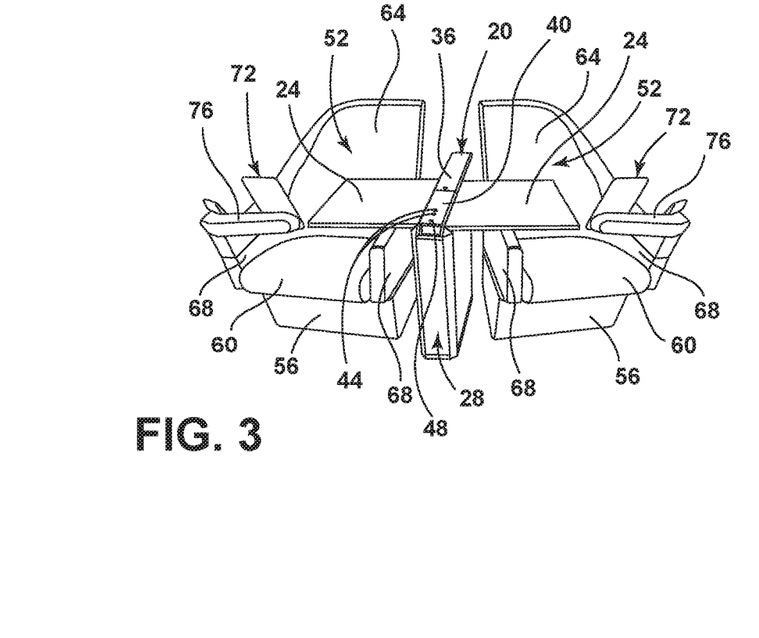
FIG. 3 is a front perspective view of the connectivity module, illustrating work surfaces extended over each of the seating assemblies.
Figure 4:
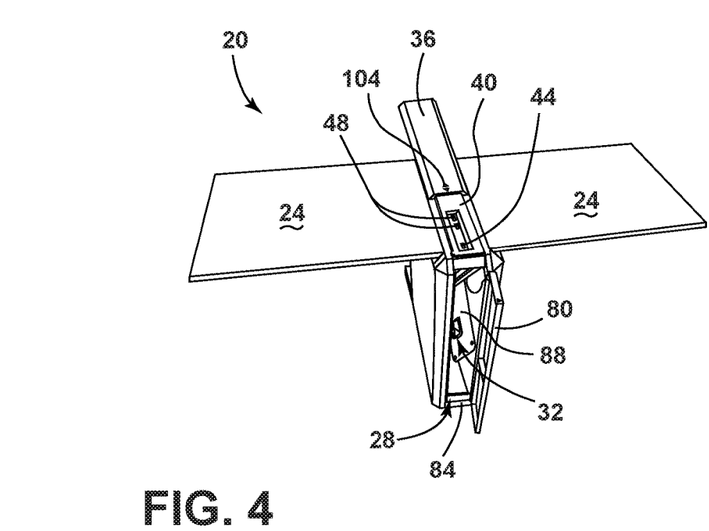
FIG. 4 is a front perspective view of the connectivity module, illustrating a compartment having a device holder in a stored position.
Figure 5:
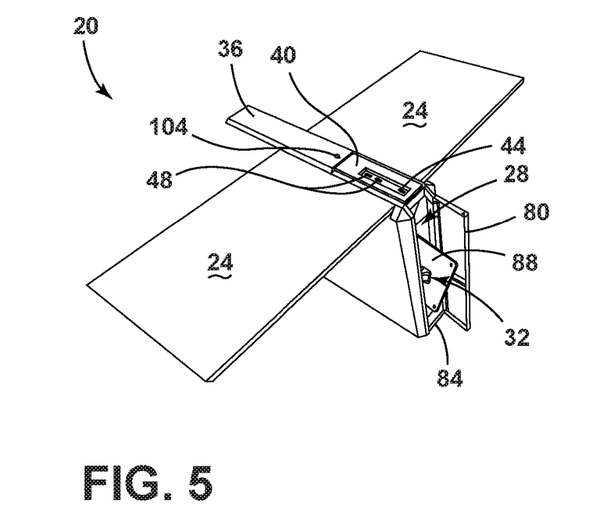
FIG. 5 is a side perspective view of the connectivity module, illustrating the compartment with the device holder.
Figure 6:
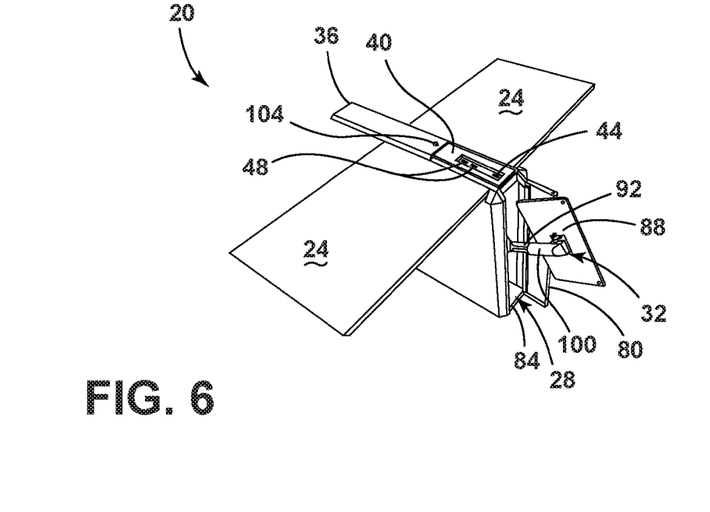
FIG. 6 is a side perspective view of the connectivity module, illustrating the device holder in a partially-deployed position.
Figure 7:
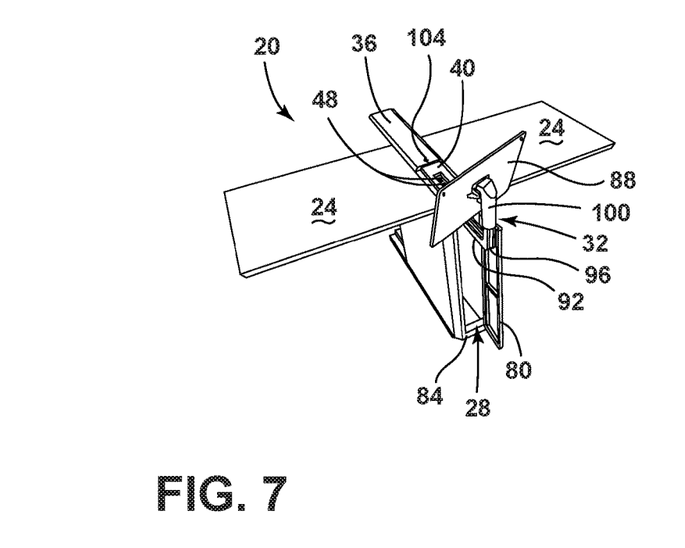
FIG. 7 is a front perspective view of the connectivity module, illustrating the device holder in a use position.
Figure 8:
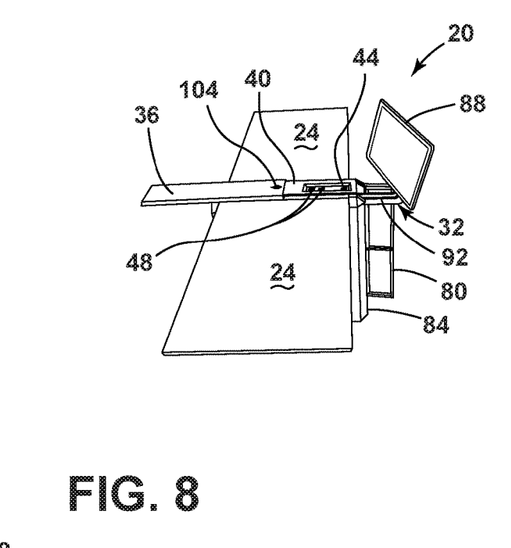
FIG. 8 is a side perspective view of the connectivity module, illustrating the device holder in the use position.
Figure 9:
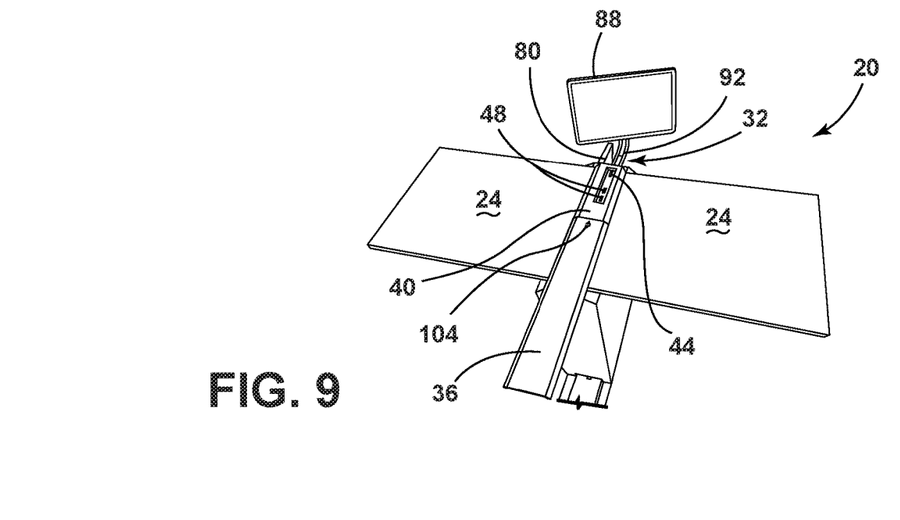
FIG. 9 is a rear perspective view of the connectivity module, illustrating the device holder in the use position.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a connectivity module. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about," It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-15, a vehicle may be equipped with a connectivity module 20. The connectivity module 20 includes at least one work surface 24 that is deployable and is extendably coupled to the connectivity module 20. The connectivity module 20 is equipped with a compartment 28. In one example, a device holder 32 is deployably housed within the compartment 28. An armrest 36 is slidably coupled to a first side, which may be a top side 40 of the connectivity module 20 in some examples. The armrest 36 conceals at least one of a power outlet 44 and a mobile device connector 48 (e.g., USB plug).

Referring again to FIGS. 1-3, the connectivity module 20 may be positioned proximate one or more seating assemblies 52. The seating assemblies 52 may be positioned as first row, second row, third row, fourth row, or any other position within a cabin of the vehicle. It is contemplated that the seating assemblies 52 and/or the connectivity module 20 may be movable to various locations within the cabin of the vehicle to provide the cabin with a greater degree of customization and configurability. The seating assemblies 52 may be equipped with a seat base 56 that supports a seat 60, and a seatback 64 that is coupled to the seat 60. The seating assemblies 52 may include side bolsters 68. The side bolsters 68 may be integrally formed with the seat 60 and/or the seatback 64. Alternatively, the side bolsters 68 may be coupled directly to the seat base 56. The seating assemblies 52 may be equipped with a vehicle interaction interface 72. The vehicle interaction interface 72 may be coupled directly to the seating assembly 52. For example, the vehicle interaction interface 72 may be coupled directly to one of the side bolsters 68 by an interface arm 76. The interface arm 76 may alternatively be coupled directly to the seat base 56, the seat 60, and/or the seatback 64. The interface arm 76 may be movably coupled to the seating assembly 52, such as pivotably and/or extendably coupled, such that a user may ingress to, or egress from, the seating assembly 52 unimpeded by the vehicle interaction interface 72 and/or the interface arm 76. Additionally, the movable coupling of the interface arm relative to the seating assembly 52 permits the user to store the vehicle interaction interface 72 when the vehicle interaction interface 72 is not actively being used. The vehicle interaction interface 72 may be utilized by a user to interact with the vehicle. For example, actions that the vehicle interaction interface 72 may allow the user to execute may include, but are not limited to, inputting directions to a desired destination, accessing the internet, accessing traffic reports, checking weather conditions, adjusting the position of the seating assembly 52 within the cabin, adjusting comfort settings within the cabin (e.g., temperature, humidity, privacy windows, etc.), and/or adjusting comfort settings of the seating assembly 52 (e.g., height of seat 60, tilt of seatback 64, heat or ventilation of the seating assembly 52, etc.).

Referring now to FIGS. 4-9, the connectivity module 20 is equipped with the compartment 28. The compartment 28 may be accessible by way of a compartment door 80 that is hingedly coupled to a front side 84 of the connectivity module 20. The device holder 32 is deployably housed within the compartment 28 of the connectivity module 20. The device holder 32 may have a mobile device 88 directly coupled thereto. Alternatively, the device holder 32 may be provided with a universal mobile device bracket that is configured to receive mobile devices 88 of various sizes and shapes. The mobile device 88 may be utilized for a variety of tasks, such as providing entertainment (e.g., games, movies, etc.), providing a mobile office (e.g., tablet), providing internet surfing capabilities, and so on. In some examples, the mobile device 88 provides utilities and features that are independent and distinct from those provided by the vehicle interaction interface 72. The mobile device 88, or universal mobile device bracket, may be deployably coupled to the compartment 28 by a device holder arm 92. In some examples, the device holder 32 may be actuated between a stored position (FIG. 4) and a use position (FIGS. 7-9) by linear and rotational motion. For example, the device holder arm 92 may be pivotably coupled to a ceiling of the compartment 28. Additionally or alternatively, the device holder arm 92 may be slidably coupled to the ceiling of the compartment 28 to aid in stowing of the device holder 32 and/or fore and aft adjustment of the device holder 32 relative to the seating assemblies 52 when the device holder 32 is in the use position.

Referring again to FIGS. 4-9, the device holder arm 92 may be equipped with an elbow 96 that creates an angular relationship between a first leg of the device holder arm 92 that is coupled to the connectivity module 20 and a second leg that is configured to couple to the mobile device 88. The elbow 96 may be fixed in some examples. Alternatively, the elbow 96 may be actuatable. The examples that utilize an actuatable elbow 96 may permit more compact storage of the device holder 32 and/or provide the user with the ability to adjust a viewing angle of the mobile device 88. In some examples, the elbow 96 may be fixed and the viewing angle of the mobile device 88 may be accomplished by a pivotable coupling of the mobile device 88 to the second leg of the device holder arm 92. The second leg of the device holder arm 92 may couple to the mobile device 88 by way of a sleeve 100 that is adjustable. The sleeve 100 may be slidably coupled to the second leg of the device holder arm 92 such that a vertical height of the mobile device 88 may be adjusted when the device holder 32 is in the use position. In various examples, the rotational motion of the device holder 32 as the device holder 32 is transitioned from the stored position to the use position may occur along at least two planes of rotation.

Referring further to FIGS. 4-9, the connectivity module 20 is equipped with the armrest 36 that is coupled to the top side 40 of the connectivity module 20. The armrest 36 is slidably coupled to the top side 40 of the connectivity module 20. The armrest 36 may be actuated manually or in a motorized fashion to reveal at least one power outlet 44 and/or at least one mobile device connector 48. The actuation of the armrest 36 may be accomplished by one or more buttons 104 that selectively reveal and conceal the power outlet 44 and the mobile device connector 48. The power outlet 44 and the mobile device connector 48 are recessed within the top side 40 of the connectivity module 20. In some examples, a top surface of the armrest 36 may be padded to provide greater comfort to a user while utilizing the armrest 36.

Figure 10:
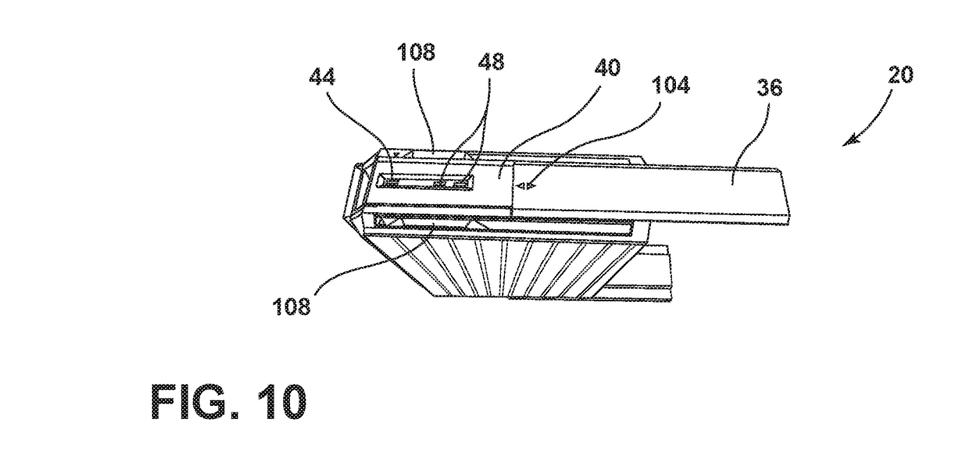
FIG. 10 is top perspective view of the connectivity module, illustrating an armrest in a retracted position.
Figure 11:
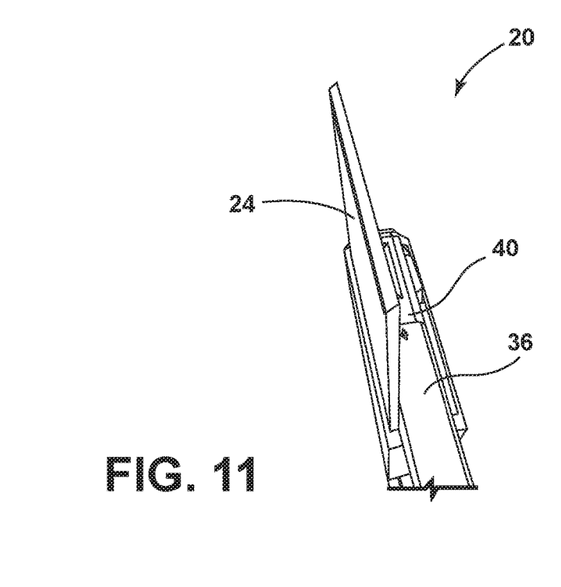
FIG. 11 is a rear perspective view of the connectivity module, illustrating the work surface in a partially-deployed position.
Figure 12:
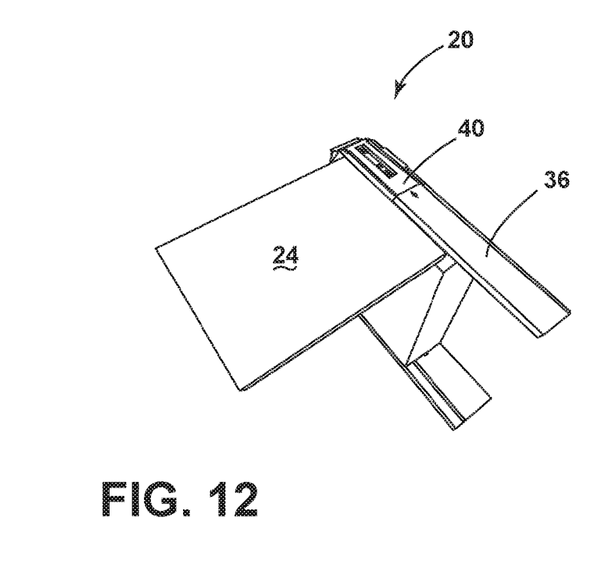
FIG. 12 is a rear perspective view of the connectivity e, illustrating the work surface in a deployed position.

Referring to FIGS. 10-12, the work surface 24 is movable between a stowed position (FIG. 10) and a deployed position (FIG. 12). The work surface 24 may be stowed vertically along one or more sides of the connectivity module 20. Actuation of the work surface 24 may be accomplished my manual or powered operation. For example, the work surface 24 may be provided with a handle 108 that is coupled to, or integrally formed with, an edge of the work surface 24. The handle 108 is pulled on by a user in a vertical direction to extend the work surface 24 from the stowed position to a partially-deployed position (FIG. 11). Once the work surface 24 has extended from the stowed position a predetermined distance, the work surface 24 may be permitted to rotate in a downward direction away from the connectivity module 20 to assume the deployed position. Accordingly, the connectivity module 20 is provided with at least one deployable work surface 24 that is actuated from the stowed position to the deployed position by linear actuation in the vertical direction and rotational actuation toward a user.

Figure 13:
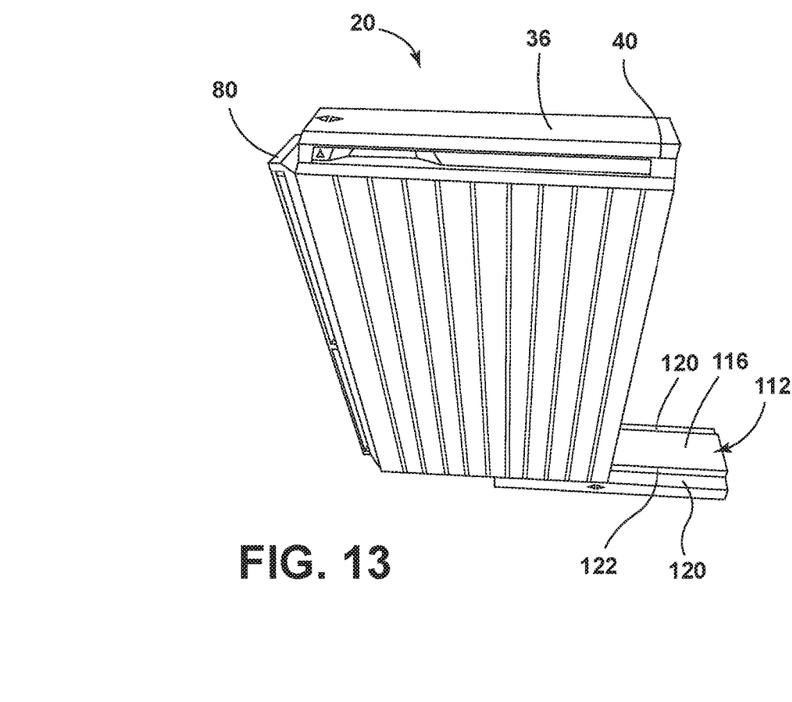
FIG. 13 is a side perspective view of the connectivity module, illustrating a slidable coupling of the connectivity module to a rail assembly, according to one embodiment.
Figure 14:
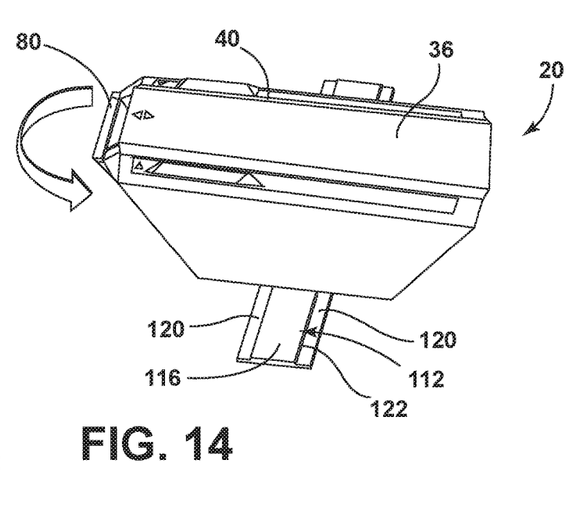
FIG. 14 is a rear perspective view of the connectivity module, illustrating a rotatable coupling of the connectivity module to the rail assembly, according to one embodiment.
Figure 15:
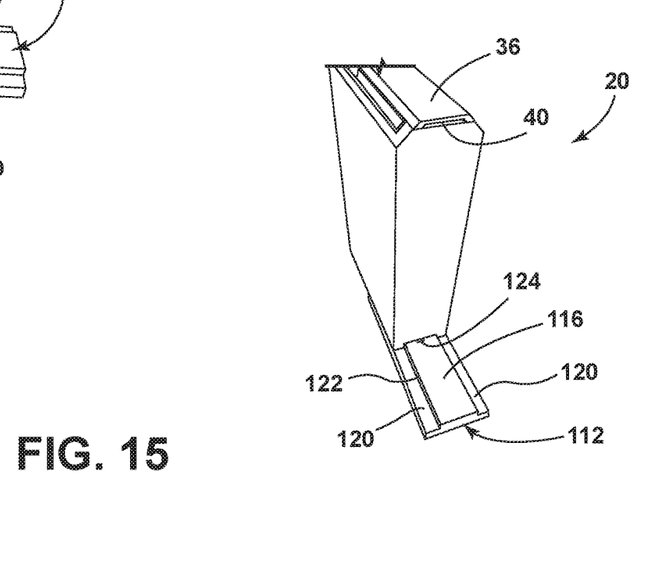
FIG. 15 is a rear perspective view of the connectivity module, illustrating the slidable coupling of the connectivity module to the rail assembly, according to one embodiment.

Referring now to FIGS. 13-15, the connectivity module 20 may be slidably coupled to a rail assembly 112. The rail assembly 112 may include a central portion 116 that is raised relative to side portions 120 of the rail assembly 112 that flank either side of the central portion 116. The rail assembly 112 is utilized as a guide for actuating the connectivity module 20 in a fore-aft direction relative to the seating assemblies 52 within the vehicle. The central portion 116 and the side portions are substantially continuous such that the connectivity module 20 is provided with continuous support and may be retained in position during normal use as well as during impact events, such as from cargo items or during vehicle-to-vehicle impact events. Sidewalls 122 of the central portion 116 may provide lateral retention forces to the connectivity module 20. The central portion 116 may be provided with locking apertures 124 disposed therein for defining discrete positions of the connectivity module 20 along the rail assembly 112. The connectivity module 20 may be configured to extend beyond the extent of the rail assembly 112 such that at least a portion of the connectivity module 20 is not directly supported by the rail assembly 112. For example, at least about ten percent of the length of the connectivity module 20 may not be directly supported by the rail assembly 112, at least about twenty percent of the length of the connectivity module 20 may not be directly supported by the rail assembly 112, at least about thirty percent of the length of the connectivity module 20 may not be directly supported by the rail assembly 112, at least about forty percent of the length of the connectivity module 20 may not be directly supported by the rail assembly 112, at least about fifty percent of the length of the connectivity module 20 may not be directly supported by the rail assembly 112, at least about sixty percent of the length of the connectivity module 20 may not be directly supported by the rail assembly 112, and/or combinations or ranges thereof, including intermediate values.

Referring again to FIGS. 13-15, the connectivity module 20 may be additionally or alternatively coupled to the rail assembly 112 in a manner that permits rotational motion of the connectivity module 20 relative to the rail assembly 112. In the depicted example, the connectivity module is coupled to the rail assembly 112 and is rotatable about a vertical axis relative to the rail assembly 112. In examples where the central portion 116 is raised above the side portions 120 that flank the central portion 116, the connectivity module 20 may be provided with locking pins that are movable or spring-biased toward the locking apertures 124. The movable or spring-biased locking pins may interact with the rail assembly 112 in such a way that upon rotational actuation of the connectivity module 20, the connectivity module 20 as a whole may be vertically actuated to clear a height difference between the side portions 120 and the central portion 116 while the locking pins remain engaged with the locking apertures 124. Said another way, the connectivity module 20 may be configured to clear the sidewalls 122 upon rotational actuation of the connectivity module 20 relative to the rail assembly 112. In alternative examples, the central portion 116 and the side portions 120 may be level with one another such that the sidewalls 122 are not present. Accordingly, the connectivity module 20 does not require vertical actuation relative to the rail assembly 112 upon rotational actuation of the connectivity module 20. The rail assembly 112 may be provided as an integrated dual-rail system that allows the connectivity module 20 to move along a floor of the vehicle while also allowing for incremental adjustments through the use of a secondary travel-and-swivel system that increases a range of uses for the connectivity module 20 in vehicles with adjustable seating configurations. Regardless of the configuration, the connectivity module 20 may be permitted to rotate through an angular displacement of at least about five-degrees, at least about forty-five-degrees, at least about ninety-degrees, at least about one-hundred-eighty-degrees, at least about three-hundred-sixty-degrees, and/or combinations or ranges thereof, including intermediate values. Accordingly, the connectivity module 20 may be mountable in-line with the rail assembly 112 in at least two orientations. For example, the connectivity module 20 may be transitioned from providing the compartment door 80 as forward-facing to providing the compartment door 80 as rearward-facing.

The connectivity module 20 of the present disclosure allows for movement of the connectivity module 20 throughout a vehicle environment in an adaptable way that compliments a variety of configurations of a cabin of the vehicle. Conventional vehicles have limited motion options, flexibility options, and configuration options, particularly in the cabin area. The connectivity module 20 of the present disclosure provides work surfaces 24, device holders 32, and other functionality and connectivity in a space-efficient package that can be easily stored and implemented in the cabins of vehicles, which tend to have limited space.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle comprising:
    a connectivity module;
    at least one deployable work surface extendably coupled to the connectivity module;

a compartment within the connectivity module;
a device holder deployably housed within the compartment, wherein the device holder is actuated from a stored position to a use position by linear and rotational motion; and
an armrest slidably coupled to a first side of the connectivity module that conceals at least one of a power outlet and a mobile device connector.

2. The vehicle of claim 1, further comprising a rail assembly, wherein the connectivity module is slidably coupled to the rail assembly.

3. The vehicle of claim 1, further comprising a rail assembly, wherein the connectivity module is coupled to the rail assembly and is rotatable about a vertical axis relative to the rail assembly.

4. The vehicle of claim 1, wherein the mobile device connector comprises a USB plug.

5. The vehicle of claim 1, wherein the connectivity module is positioned in close proximity to one or more seating assemblies.

6. The vehicle of claim 5, wherein the one or more seating assemblies are equipped with a vehicle interaction interface.

7. The vehicle of claim 1, wherein the at least one deployable work surface is actuated from a stowed position to a deployed position by linear actuation in a vertical direction and rotational actuation toward a user.

8. The vehicle of claim 1, wherein the rotational motion of the device holder occurs along at least two planes of rotation.

9. A vehicle comprising:
a connectivity module slidably and rotatably coupled to a rail assembly, wherein the connectivity module comprises:
at least one deployable work surface extendably coupled thereto;
a compartment within the connectivity module;
a device holder deployably housed within the compartment; and
an armrest slidably coupled to a first side of the connectivity module that conceals at least one of a power outlet and a mobile device connector.

10. The vehicle of claim 9, wherein the rotatable coupling of the connectivity module provides rotatable motion of the connectivity module about a vertical axis relative to the rail assembly.

11. The vehicle of claim 9, wherein the connectivity module is positioned in close proximity to one or more seating assemblies.

12. The vehicle of claim 11, wherein the one or more seating assemblies are equipped with a vehicle interaction interface.

13. The vehicle of claim 9, wherein the at least one deployable work surface is actuated from a stowed position to a deployed position by linear actuation in a vertical direction and rotational actuation toward a user.

14. The vehicle of claim 9, wherein the device holder is actuated from a stored position to a use position by linear and rotational motion.

15. The vehicle of claim 14, wherein the rotational motion of the device holder occurs along at least two planes of rotation.

16. A connectivity module comprising:
at least one deployable work surface extendably coupled thereto;
a device holder deployably housed within a compartment; and
an armrest slidably coupled to a first side of the connectivity module that conceals at least one of a power outlet and a mobile device connector, wherein the connectivity module is slidably coupled to a rail assembly, and wherein the connectivity module is rotatable about a vertical axis relative to the rail assembly.

17. The connectivity module of claim 16, wherein the at least one deployable work surface is actuated from a stowed position to a deployed position by linear actuation in a vertical direction and rotational actuation toward a user.

18. The connectivity module of claim 17, wherein the device holder is actuated from a stored position to a use position by linear and rotational motion, and wherein the rotational motion of the device holder occurs along at least two planes of rotation.

19. The connectivity module of claim 18, wherein the connectivity module is installed in a vehicle.

* * * * *